United States Patent [19]
Hardjono

[11] Patent Number: 6,115,699
[45] Date of Patent: Sep. 5, 2000

[54] SYSTEM FOR MEDIATING DELIVERY OF A DOCUMENT BETWEEN TWO NETWORK SITES

[75] Inventor: Thomas Hardjono, Arlington, Mass.

[73] Assignee: Nortel Networks Corporation, Montreal, Canada

[21] Appl. No.: 09/204,581

[22] Filed: Dec. 3, 1998

[51] Int. Cl.[7] .................................................. G06F 16/60
[52] U.S. Cl. ........................ 705/51; 705/57; 380/23; 380/24; 380/25
[58] Field of Search ................................. 705/1, 51, 57; 380/23, 24, 25

[56] References Cited

U.S. PATENT DOCUMENTS 5,509,074  4/1996  Choudhury et al. ........................ 705/51

FOREIGN PATENT DOCUMENTS 2047506  4/1979  United Kingdom .

OTHER PUBLICATIONS

Marie A. Wright, Encryption Alternative for Network Security, pp. 1–2, Mar. 1996.
Northern Exposure, Telemedia News & Views, pp. 1–2, May 1994.
IBM AS/400 announcements, pp. 1–2, May 1991.
Rik Farrow, Why Doesn't Everybody Encrypt?, pp. 1, Aug. 1994.
Gerald Williams et al, NetworkWorld, pp. 1–4, Oct. 1995.

*Primary Examiner*—James P. Trammell
*Assistant Examiner*—Mussie Tesfamariam
*Attorney, Agent, or Firm*—Bromberg & Sunstein LLP

[57] ABSTRACT

A system for mediating delivery of a document from a sending site to a receiving site utilizes respective sending and receiving agents as intermediaries. The document is encrypted by the sending site to produce an encrypted copy that is delivered to the input of the receiving agent. At any time before, during, or after receipt of the encrypted copy at the input, a receiving agent variable is produced that is associated with a decrypting key for decrypting the encrypted document. The receiving agent variable is produced based upon a parameter that is not available to the sending agent. The receiving agent variable is directed to the sending agent after receipt of the encrypted copy at the input of the receiving agent.

48 Claims, 6 Drawing Sheets

SYSTEM FOR MEDIATING DELIVERY OF A DOCUMENT BETWEEN TWO NETWORK SITES

FIELD OF THE INVENTION

The invention generally relates networks and, more particularly, the invention relates to mediating document delivery between two network sites.

BACKGROUND OF THE INVENTION

Documents commonly are transmitted (i.e., delivered) between two or more network sites via a computer network such as, for example, the Internet. Such documents may be any known item that is capable of being represented in electronic form and transmitted between computer systems. Among other things, application programs, output from application programs (e.g., a word processing document), generic computer files, video transmissions, data messages (e.g., electronic mail), and World Wide Web pages in the Hypertext Markup language ("HTML") all may be considered to be documents.

It often is desirable that a document transmitted by a sending network site ("sender") be "non-reputedly" received by a receiving network site ("receiver"). As is known in the art, an electronic document is considered to be non-reputedly delivered when it can be proven with a high degree of certainty that the document was received by the receiving network site. To that end, unbiased third party agents ("agents") have been utilized to witness and record delivery of a document to a receiver. Agents typically intercept a document from the sender and retransmit it to the receiver after recording pertinent information, such as the sender's address, the receiver's address, date of transmission, and the contents of the document.

Problems arise, however, when a sender and a receiver cannot agree upon a single agent. In such case, electronic delivery of a document can become cumbersome and very difficult to confirm.

SUMMARY OF THE INVENTION

In accordance with one aspect of the invention, a system for mediating delivery of a document from a sending site to a receiving site utilizes respective sending and receiving agents as intermediaries. The document is encrypted by the sending site to produce an encrypted copy that is delivered to the input of the receiving agent. At any time before, during, or after receipt of the encrypted copy at the input, a receiving agent variable is produced that is associated with a decrypting key for decrypting the encrypted document. The receiving agent variable is produced based upon a parameter that is not available to the sending agent. The receiving agent variable is directed to the sending agent after receipt of the encrypted copy at the input of the receiving agent.

In preferred embodiments, the encrypted copy is directed to the receiving agent by the sending site via an electronic transmission medium, such as the Internet, or via a removable diskette that is manually transported to the receiving agent. After the encrypted document is received, the encrypted copy may be decrypted ("decrypted copy") and transmitted (manually or electronically) to the receiving site. The encrypted document may be decrypted by receiving a sending agent variable from the sending agent, utilizing the sending agent variable and receiving agent variable as variables in a function that produces the decrypting key, and applying the decrypting key to the encrypted copy to produce the decrypted copy of the document. In a manner similar to the receiving agent variable, the sending agent variable is based upon a parameter that is not available to the receiving agent.

All variables and documents may be transmitted via a secure channel such as, for example, an electronic or manual channel. The parameter not available to the sending agent may include a secret key from an asymmetrical public key pair associated with the receiving agent. In preferred embodiments, the receiving agent variable is produced by the receiving agent.

In further embodiments, an additional encrypted copy of the document is encrypted by the receiving site and transmitted to the receiving agent. If not already received, then the sending agent variable then subsequently may be received at the input of the receiving agent for producing the decrypting key. Both the encrypted copy and the additional encrypted copy may be decrypted with the decrypting key to produce a decrypted copy and an additional decrypted copy. Both decrypted copies then may be compared to determine if they are consistent (described below). Either one of the decrypted copies then may be delivered to the receiving site if the document is deemed to be consistent.

The decrypted copy and additional decrypted copy each may include at least a body portion and an additional portion. The decrypted copy may be deemed to be consistent with the additional decrypted copy if the body portions of both decrypted documents are compared and determined to be identical. A bitwise comparison may be utilized to compare the bodies. The two decrypted documents still may be considered to be consistent even when the additional portion of each is not identical. For example, the additional portion may include a digital signature of either one of the sending site or the receiving site.

In accordance with another aspect of the invention, a system for mediating delivery of a document from a first site to a second site may first control the first site to encrypt the document to produce an encrypted document. The copy of the encrypted document may be received at the input of the second site. A second variable may be produced that is associated with a decrypting key for decrypting the encrypted document. The second variable may be based upon a parameter not available to the first site. The second variable may be directed to the first site after receipt of the copy of the encrypted document at the input.

In accordance with other aspects of the invention, a system for mediating delivery of a document from a sending site to a receiving site utilizes respective sending and receiving agents as intermediaries. The sending agent preferably includes non-volatile memory. The document is encrypted by the first site to produce an encrypted copy that is delivered to the sending agent and the receiving agent. A sending agent variable is produced that is associated with a decrypting key for decrypting the encrypted document. In a manner similar to other aspects of the invention, the sending agent variable is based upon a parameter that is not available to the receiving agent. The receiving agent variable that is produced by the receiving agent is received after the encrypted document is received by the receiving agent. The receiving agent variable also is based upon a parameter that is not available to the sending agent, and is associated with the decrypting key. In preferred embodiments, the sending agent variable, the receiving agent variable, and the encrypted copy all are stored in memory. Both variables and the encrypted document may be retrieved from the memory of the first agent for subsequently proving that the document was delivered to the receiving site. To that end, the decrypting key may be produced from the sending agent variable and receiving agent variable, and then utilized to decrypt the encrypted copy.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
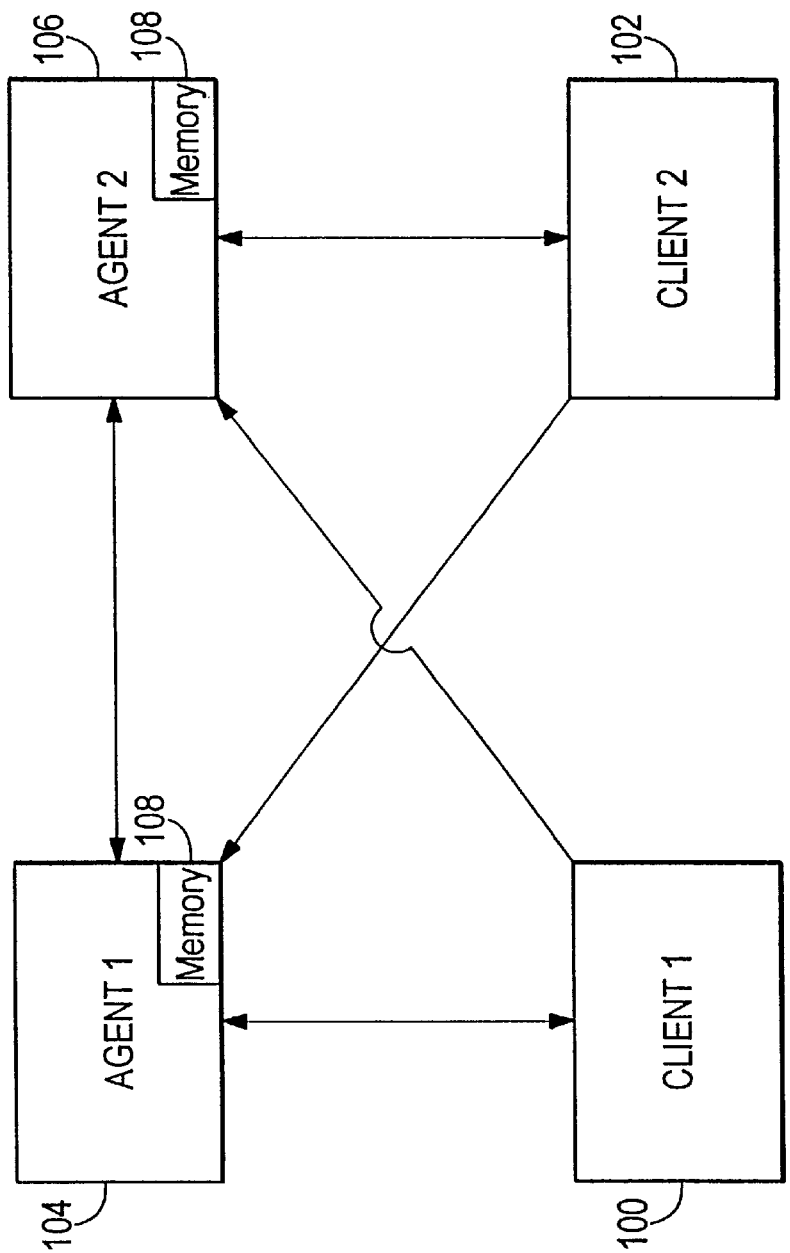
FIG. 1 schematically shows a document exchange system in which a first site exchanges documents with a second site via a first agent and a second agent.

FIG. 1 schematically shows a document exchange system in which a first network site ("first client 100") exchanges documents with a second network site ("second client 102") via a first agent 104 and a second agent 106. In preferred embodiments, the first agent 104 is selected by the first client 100, while the second agent 106 is selected by the second client 102. As discussed in detail below, the first and second agents 104 and 106 cooperate to substantially non-reputedly deliver documents between their respective clients. The first client 100, second client 102, first agent 104, and second agent 106 each may be nodes (e.g., network servers) on a computer network, such as the Internet. Documents may be transmitted across the network via secure or unsecure channels in accord with conventionally known techniques. Alternatively, the first client 100, second client 102, first agent 104 and second agent 106 may be computer devices that are not connected to a computer network. In such case, documents may be transmitted between devices by other means such as, for example, via a diskette that is manually transported between devices.

In preferred embodiments, the clients and agents each include a computer system having a central processing unit (not shown), random access memory (not shown) for temporary storage of data, and nonvolatile storage media for mass data storage. Among other things, the nonvolatile storage media may include a diskette, a hard drive, a writeable digital versatile disk, a tape drive, and/or a writeable CD-ROM (compact disk read only memory).

Each of the clients and agents preferably communicate by utilizing conventionally known public key encryption methods. Such encryption methods may utilize either or both public key pairs (i.e., asymmetrical encryption), or single keys (i.e., symmetrical encryption). Accordingly, each of the agents and clients preferably is capable of utilizing asymmetrical encryption methods and thus, has a public key and a private key. In addition to the individual public key pairs, each agent/client pair has a dynamically changing public key pair ("document public key pair") that is generated by its client each time a new document is to be transmitted from one of the clients to the other client. Accordingly, the first agent 104 and first client 100 have a document public key pair, while the second agent 106 and second client 102 also have a document public key pair. The reasons for the document public key pair are described below.

Figure 2:
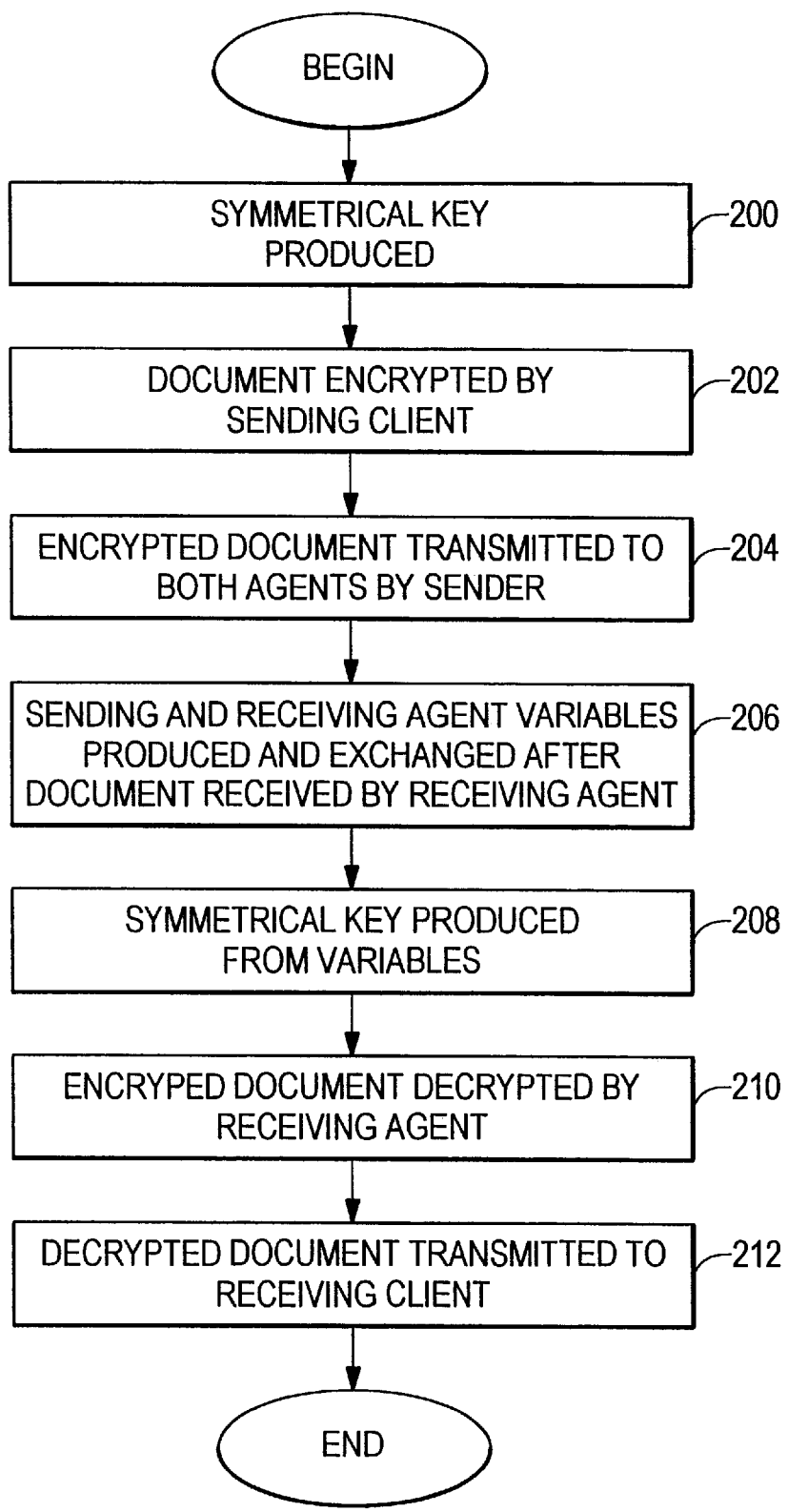
FIG. 2 shows a preferred process of mediating delivery of a document from the first site to the second site shown in FIG. 1.

FIG. 2 shows a preferred process of mediating delivery of a document from the first client 100 to the second client 102. As noted above, such document may be any known item that is capable of being represented in electronic form and transmitted between computer devices. Among other things, application programs, output from application programs (e.g., a word processing document), generic computer files, video transmissions, data messages (e.g., electronic mail), and World Wide Web pages in the Hypertext Markup language ("HTML") all may be considered to be documents.

While describing the process shown in FIG. 2, the first client 100 is referred to as the "sending client 100", while the second client 102 is referred to as the "receiving client 102." In a similar manner, the first agent 104 is referred to as the "sending agent 104" while the second agent 106 is referred to as the "receiving agent 106." The process begins at step 200 in which the sending client 100 produces a symmetrical encrypting/decrypting key ("symmetrical key") in accord with a first key generating method. Such first key generating method utilizes the public key of the sending agent 104, the public key of the receiving agent 106, and the secret document key of the sending client/sending agent pair as input into a selected function that produces the symmetrical key. The selected function may be any arbitrary function known in the art that enables the symmetrical key to be reconstructed (discussed below) via a combination of the public document key of the sending client/sending agent pair, the sending agent secret key, and the receiving agent secret key. In preferred embodiments, the selected function is a logical "exclusive or" (a/k/a "XOR") operation. To generate the symmetrical key, an XOR operation thus may be applied to each of the bits of the various input keys. As is known in the art, both public keys are publicly available to anybody by accessing a key certification authority, while the secret document key of the sending client/sending agent pair is available to the sending client 100 only. As such, the receiving agent 106 and receiving client 102 cannot generate such symmetrical key with this first key generating method.

A second key generating method that also may be utilized to generate the symmetrical key is discussed below with reference to steps 206 and 208. As discussed in those steps, the second key generating method requires that both the sending agent 104 and the receiving agent 106 collaborate to produce the symmetrical key. Absent such collaboration, the symmetrical key cannot be reproduced for use by the receiving agent 106 to decrypt the encrypted document.

After the symmetrical key is generated by the first key generating method, the process continues to step 202 in which the sending client 100 utilizes the symmetrical key to encrypt the document. The encrypted document and the public document key of the sending client/sending agent pair then is transmitted to both the sending agent 104 and the receiving agent 106 (step 204). As noted above, although electronic transmission may be utilized, it also is contemplated that the document may be transmitted manually (e.g., via a removable memory device). For example, the encrypted document first may be stored on a diskette by the sending client 100 and then be transported to the agents by hand, automobile, airplane, or other manual delivery method.

In preferred embodiments, each data transmission between the devices in the system are via a "secure channel." A transmission channel is considered to be "secure" when known security methods are undertaken to ensure the confidentiality and authenticity of the transmitted document. It should be noted, however, that the term "channel" is not intended to suggest that a direct, real-time electrical connection is required between nodes (e.g., an analog connection between two conventional telephones). Any secure connection may be utilized, such as a secure packetized or cell based data delivery method (e.g., asynchronous transfer mode).

When utilizing electronic transmission media, any conventionally known security technique that ensures the integrity of the secure channel may be utilized. One such protocol is the Internet Protocol security protocol ("IPsec"), which is a well known IETF (Internet Engineering Task Force) standard defining certain requirements for establishing a secure electronic channel with a session key. One known security method that is used by the IPsec protocol that may be utilized in preferred embodiments is known as the "Rivest, Shamir, and Adleman cryptography method" (RSA cryptography method).

After the encrypted document is received by the receiving agent 106, then a receiving agent variable (discussed below) is produced and transmitted from the receiving agent 106 to the sending agent 104 (step 206). If the encrypted document is not received by the receiving agent 106, however, then the receiving agent variable is not transmitted from the receiving agent 106. Receipt of the receiving agent variable by the sending agent 104 at least in part can be used as evidence of receipt of the document by the receiving agent 106. Receipt of the encrypted document by the receiving agent 106 in turn is constructive evidence of receipt by the receiving client 102. In a similar manner, after the encrypted document is received by the sending agent 104, then a sending agent variable (discussed below) is produced and transmitted from the sending agent 104 to the receiving agent 106 (also step 206). Both agents thus have both agent variables.

The receiving agent variable and sending agent variable both are function variables that are utilized with an agent function to reproduce the symmetrical key that was used to encrypt the encrypted document. This key producing process is what was referred to above as the second key generating method. After the symmetrical key is produced by the second key generating method, then the encrypted document may be decrypted by the receiving agent 106 for delivery to the receiving client 102.

The receiving agent 106 utilizes one or more parameters as input into a variable producing function to produce the receiving agent variable. One of the parameters utilized by the receiving agent 106 to produce the receiving agent variable, however, is not available to either the sending client 100 or the sending agent 104. In preferred embodiments, the receiving agent variable is produced by inputting both the secret key of the receiving agent 106 and one of the public keys of the two document public key pairs into the variable producing function. The variable producing function may be any conventionally known function. For example, combinations of various logical operations (e.g., AND, OR and XOR) may be applied to the input keys (i.e., input parameters) of the variable producing function. Since the receiving agent secret key is available to the receiving agent 106 only, the receiving agent 106 variable may be produced by the receiving agent 106 only.

In a similar manner, the sending agent variable is produce by parameters that are not available to either the receiving client 102 or the receiving agent 106. In preferred embodiments, the sending agent variable is produced by inputting both the secret key of the sending agent 104 and one of the public keys of the two document public key pairs into the variable producing function. In a manner similar to the production of the receiving agent variable, combinations of various logical operations (e.g., AND, OR and XOR) may be applied to the input keys of the function. Since the sending agent secret key is available to the sending agent 104 only, the sending agent variable may be produced by the sending agent 104 only.

After the agent variables are exchanged by the agents, the process continues to step 208 in which the two variables are utilized as input into the agent functions to produce the symmetrical key. The encrypted document then is decrypted by the receiving agent 106 (step 210), and then transmitted to the receiving client 102 (step 212), thus completing the process.

The entire process fails if the sending agent variable is not properly and accurately transmitted to the receiving agent 106. In such event, the receiving agent 106 should notify the system administrator of the sending agent 104 requesting a retransmission of the sending agent variable. Affirmative notification of such an event thus can serve as proof that the document was not received by the receiving agent 106. In alternative embodiments, the receiving agent 106 does not transmit the receiving agent variable to the sending agent 104 until after it receives the sending agent variable.

In some embodiments, the sending agent 104 also inputs the two agent variables into the agent function to produce the symmetrical key. The sending agent 104 then utilizes the symmetrical key to decrypt the encrypted document. If the encrypted document is capable of being decrypted in this manner to produce the document as originally sent, then the receiving variable was accurate and may be used to subsequently verify delivery.

In preferred embodiments, the sending agent variable, receiving agent variable, and encrypted document are stored in non-volatile memory of the sending agent 104. As noted above, the sending agent 104 would not have the receiving agent variable if the encrypted document was not received by the receiving agent 106. Accordingly, in the event that the receiving client 102 erroneously repudiates receipt of the document, the sending agent 104 can merely produce the receiving agent variable to demonstrate receipt of the document by the receiving agent 106.

Figure 3A:
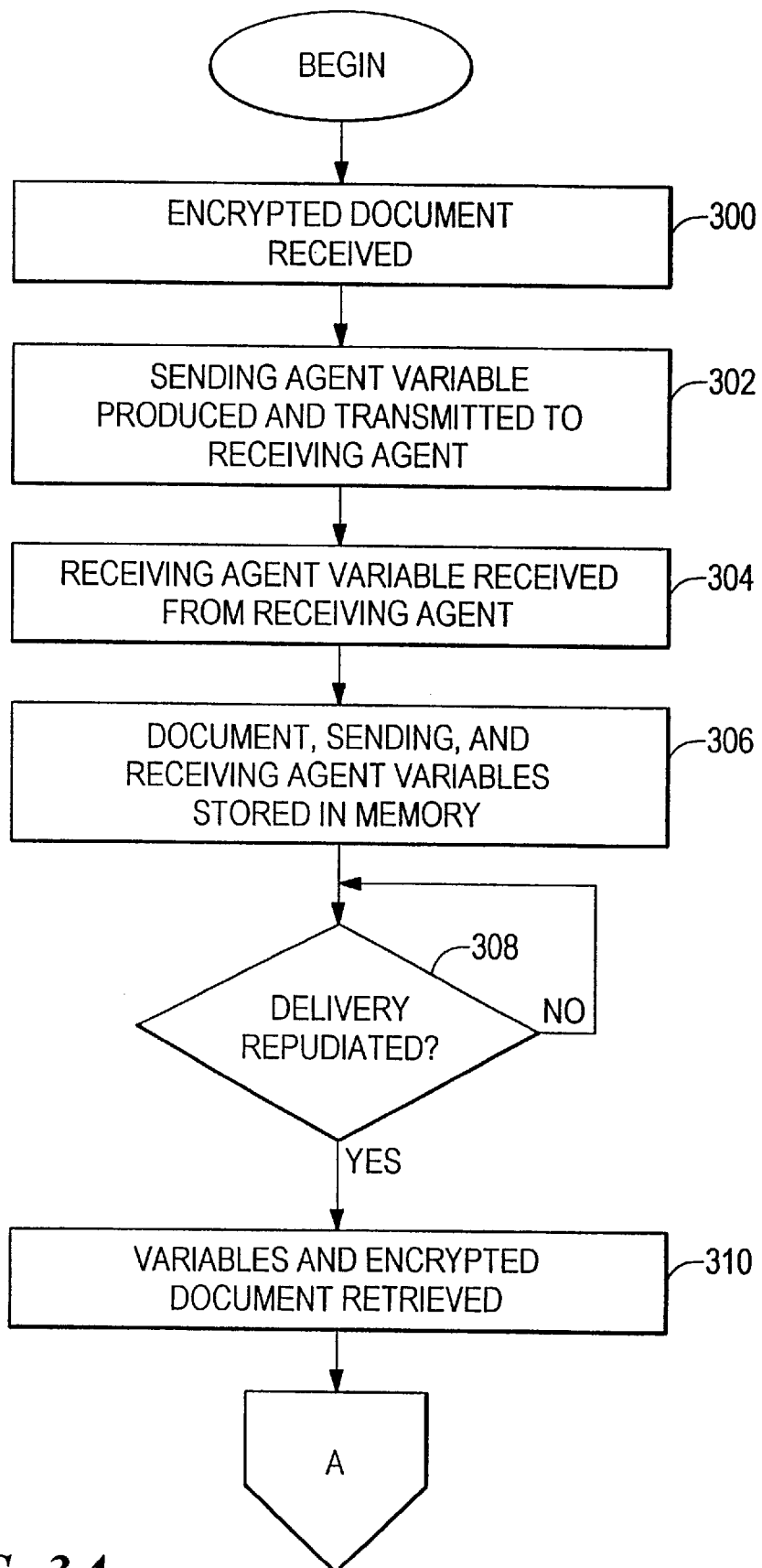
FIGS. 3A and 3B show a preferred process utilized by a first agent to demonstrate delivery of a document from a first site to a second site.
Figure 3B:
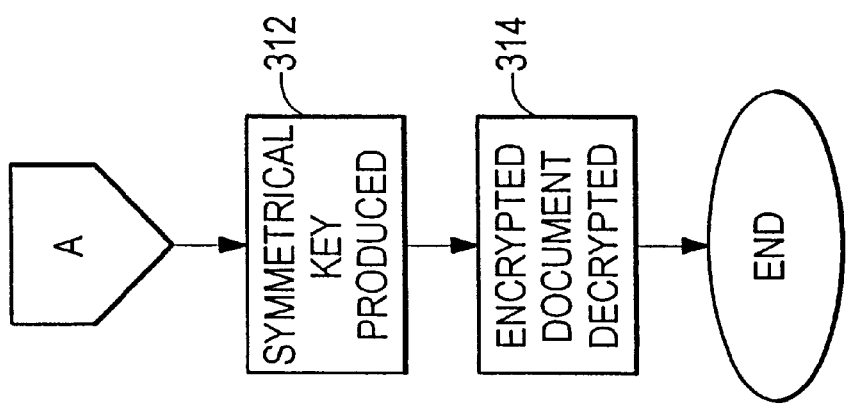

To that end, FIGS. 3A and 3B show a preferred process utilized by the sending agent 104 to demonstrate delivery of the document to the receiving client 102. It should be noted that some of the steps of this process also are executed by the process shown in FIG. 2. The process begins at step 300 in which the encrypted document is received by the sending agent 104 (similar to step 202 above). In response, the sending agent variable is produced and transmitted to the receiving agent 106 (step 302), and the receiving agent variable is received from the receiving agent 106 (step 304). The encrypted document, sending agent variable, and receiving agent variable then are stored in the non-volatile memory of the sending agent 104. It then is determined at step 308 if delivery of the document has been repudiated by the receiving agent 106. The process waits at step 308 until the receiving client 102 repudiates delivery.

If the receiving client 102 repudiates delivery, then the stored variables and encrypted document are retrieved from non-volatile memory (step 310). The process then continues to off page connector "A" to step 312, in which the symmetrical key is produced by inputting the agent variables into the agent function. The sending agent 104 then may apply the symmetrical key to the retrieved encrypted document to decrypt the document (step 314). Successful execution of this process by the sending agent 104 demonstrates receipt of the document by the receiving agent 106 and thus, the receiving client 102. Specifically, the sending agent 104 would not have the receiving agent variable unless the encrypted document was received by the receiving agent 106. Absent this variable, the sending agent 104 could not produce the symmetrical key to decrypt the encrypted document.

Figure 4:
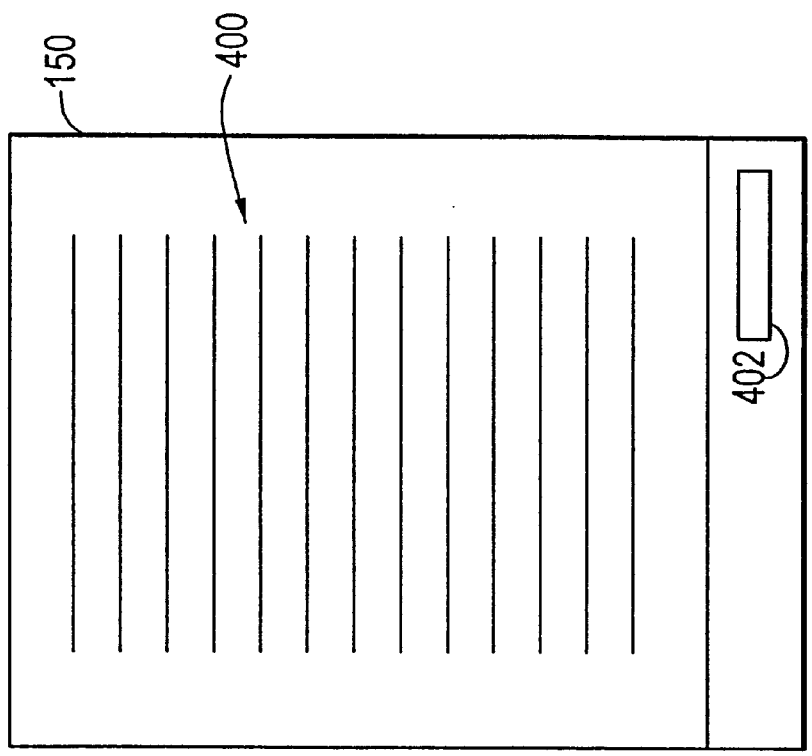
FIG. 4 shows an exemplary document that may be bidirectionally transmitted between two sites in accord with preferred embodiments of the invention.

The process shown in FIG. 2 may be expanded to bidirectionally transmit documents between the two clients. In such case, each client acts as both a receiver and a sender. One type of bidirectionally transmitted document requires a digital signature by each of the clients. For example, the document may be a legal contract that must have body portions 400 containing identical text, and a signature portion 402 that is digitally signed by both clients (see FIG. 4, which identifies the document by reference number 150). Of course, the text of the body portion 400 should be identical so that both clients sign the same contract.

Figure 5A:
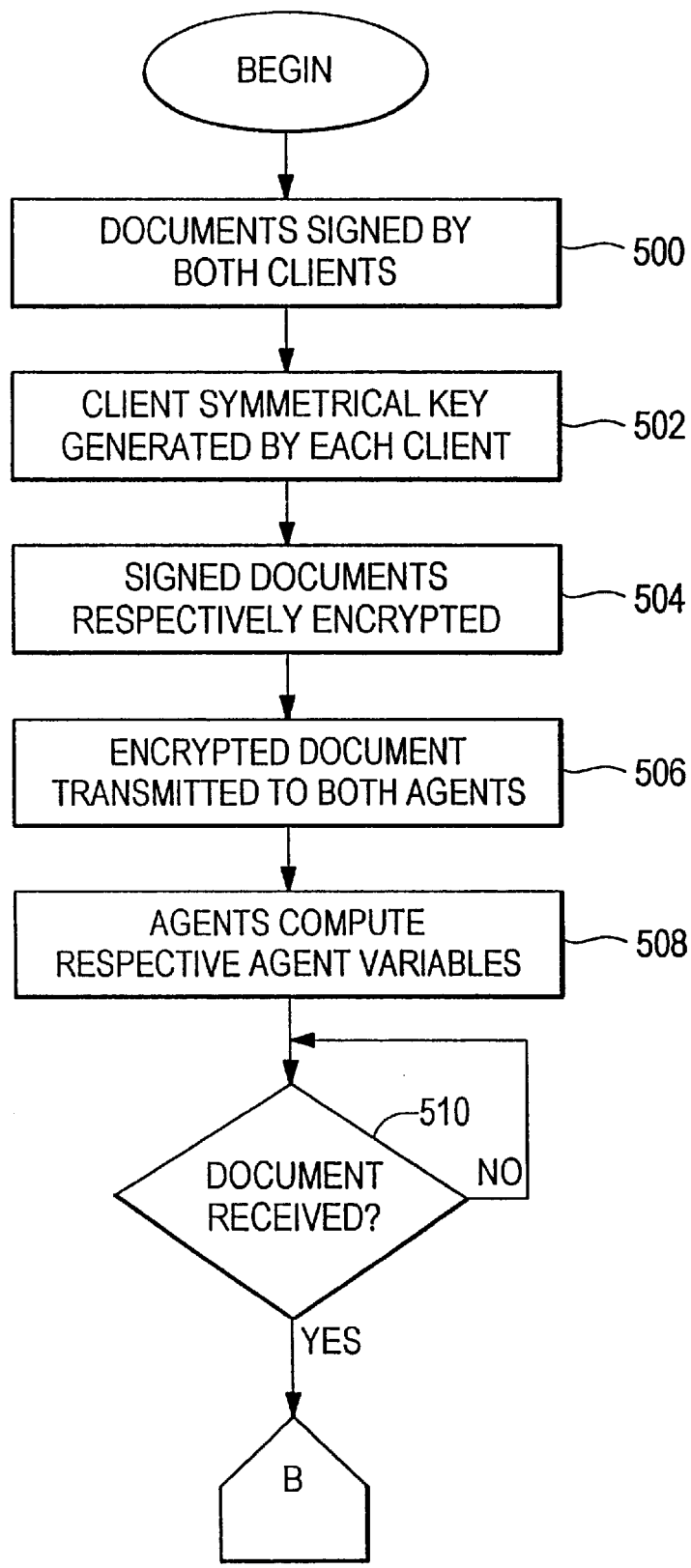
FIGS. 5A and 5B show a preferred process utilized by the system shown in FIG. 1 to bidirectionally transmit documents between two sites.
Figure 5B:
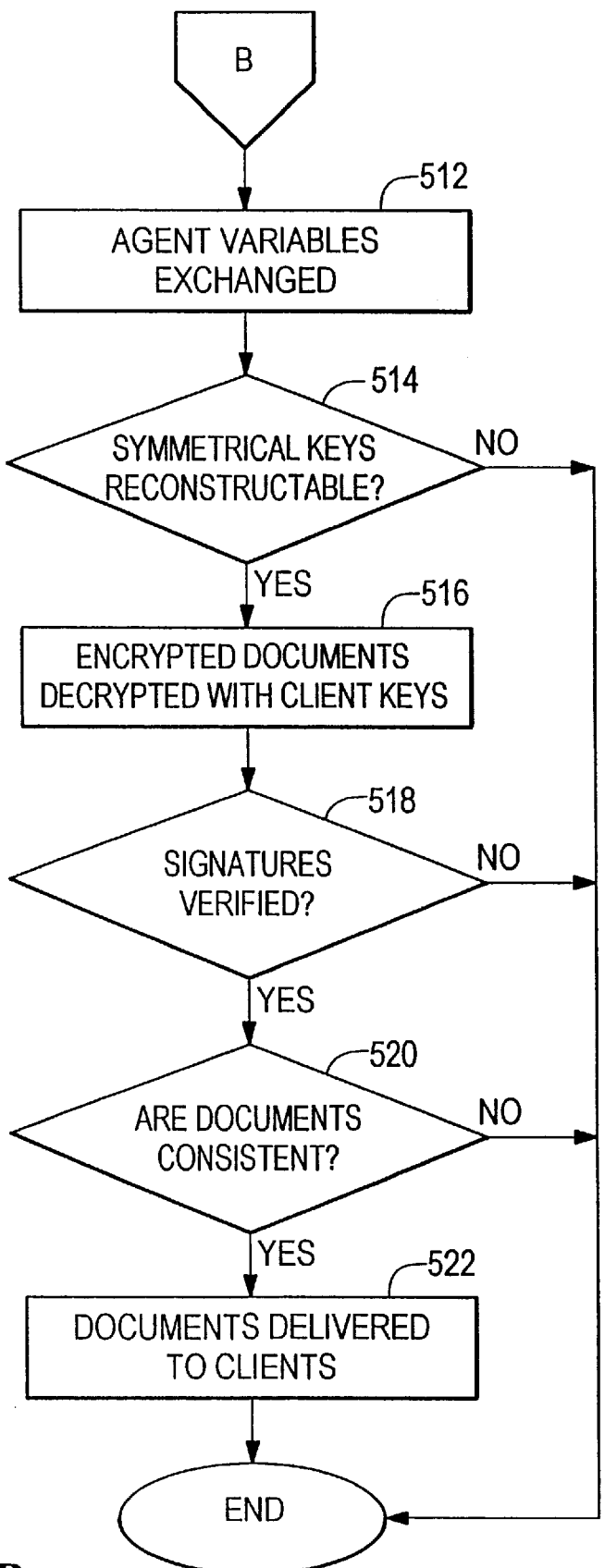

To that end, FIGS. 5A and 5B show a preferred process of bidirectionally transmitting a document contract (document). This process is not intended to be limited to contracts, however, and may be extended to other types of documents. Unlike the process shown in FIG. 2, the process shown in FIG. 5 is described in terms of the clients being first and second clients 100 and 102 since both clients act as sending clients and receiving clients 100 and 102. In a similar manner, the agents also are described as first and second agents 104 and 106. The process begins at step 500 in which each of the clients digitally signs their respective copies of the document (first copy and second copy, respectively). Any known digital signature method may be utilized, such as the well known "digital signature algorithm" (known in the art also as DSSA and standardized by the National Institute for Standards and Technology). Accordingly, in preferred embodiments, the body portion 400 of the document and the secret key of the signing client may be utilized as input to the digital signature algorithm to produce the necessary digital signature.

The process continues to step 502 in which a first client symmetrical key is produced by the first client 100 based upon the public keys of the first and second agents 104 and 106, and the secret document key associated with the first client/agent pair (i.e., the first key generating method). In a similar manner, a second client symmetrical key is produced by the second client 102 based upon the public keys of the first and second agents 104 and 106, and the secret document key associated with the second client 102 and the second agent 106 (i.e., also the first key generating method). Like the symmetrical keys discussed with reference to FIG. 2, the first and second client symmetrical keys also may be produced by the agents 104 and 106 by utilizing the second key generating method.

After the symmetrical keys are produced, the first client 100 utilizes the first client symmetrical key to encrypt the first signed copy, and the second client 102 utilizes the second client symmetrical key to encrypt the second signed copy (step 504). Both encrypted copies and the public document keys for their respective pairs then are transmitted to both agents at step 506. Accordingly, both agents have both encrypted copies of the document and both public document keys.

Upon receipt of both encrypted copies, each agent computes agent variables (step 508). A first of the agent variables is based upon the agent's secret key and the first agent 104/client pair's public document key, while a second of the agent variables is based upon the agent's secret key and the second agent/client pair's public document key. More particularly, the first agent 104 produces a primary first agent variable by inputting the first agent secret key and public document key of the first agent/client pair into the variable producing function. The first agent 104 also produces a secondary first agent variable by inputting the first agent secret key and the public document key of the second agent/client pair into the variable producing function. The second agent 106 also produces primary and secondary second agent variables with a process that corresponds to that utilized by the first agent 104.

It then is confirmed that each of the agents received their respective encrypted copies of the document. When confirmed, the process continues to off-page connector "B" to step 512, in which the agent variables are fully exchanged between the agents. Accordingly, both agents have four separate agent variables (i.e., primary and secondary first client variables, and primary and secondary second client variables).

It then is determined at step 514 if the agents can reproduce the symmetrical keys in accord with the second key generating method by utilizing the four received variables. More particularly, in preferred embodiments, each agent attempts to reconstruct both symmetrical keys based upon the four variables. The first symmetrical key preferably is reconstructed based upon the primary first agent variable and the primary second agent variable, while the second symmetrical key preferably is reconstructed based upon the secondary first agent variable and the secondary second agent variable. The process ends if either of the symmetrical keys are not reconstructible. The agent ending the process then should notify the other agent of the failure and reasons for the failure.

If the symmetrical keys are reconstructible by the second key generating method, then the process continues to step 516, in which the first agent 104 decrypts the first copy with the first client symmetrical key, and the second copy with the second client symmetrical key. In a similar manner, the second agent 106 also decrypts the first copy with the first client symmetrical key, and the second copy with the second client symmetrical key. The agents then verify the digital signature on each copy in accord with conventional processes (step 518). The process ends (i.e., fails) if a signature cannot be verified. If the signatures can be verified, it then is determined at step 520 if the documents are consistent. To that end, each notary may apply a bitwise comparison to the bodies of each decrypted copy of the document to ensure that they are identical. The signature portion 402 of the document, however, may differ since the digital signatures of both clients is different. In preferred embodiments, the documents are deemed to be consistent if the bodies are identical. If the documents are not consistent, the process fails. If the documents are consistent, however, then the signed copies of the documents are forwarded to the respective clients (step 522), thus completing the process.

As a result of this process, both the delivery and the content of the document may be confirmed and demonstrated at a subsequent time. In addition, the entire document delivery process should fail in the event that one of the parties in the system provides erroneous information to the other, such as an incorrect copy of the document, an incorrect public document key, or an incorrect agent variable.

In alternative embodiments of the invention, each agent may be implemented as software and/or hardware that is a part of its respective client. Moreover, principles of the invention may be extended to document delivery systems utilizing more than two agents, and document delivery systems delivering documents to more than two clients.

Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements, or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A method of mediating delivery of a document from a first site to a second site, the first site having an associated first agent, the second site having an associated second agent, the first site encrypting the document to produce an encrypted document, the method comprising:

receiving a copy of the encrypted document at an input of the second agent;

producing a second agent variable based upon a parameter not available to the first agent, the second agent variable being associated with a decrypting key for decrypting the encrypted document;

directing the second agent variable to the first agent after receipt of the copy of the encrypted document at the input of the second agent;

decrypting the copy of the encrypted document to produce a decrypted copy; and transmitting the decrypted copy to the second site, wherein the step of decrypting comprises:

receiving a first agent variable from the first agent, the first agent variable being based upon a parameter that is not available to the second agent;

utilizing the first agent variable and second agent variable as variables for a function that produces the decrypting key; and applying the decrypting key to the copy of the encrypted document to produce the decrypted copy.

2. The method as defined by claim 1 wherein the copy of the encrypted document is received from the first site.

3. The method as defined by claim 1 wherein the second agent variable is directed to the first agent via a secure channel.

4. The method as defined by claim 1 wherein the parameter not available to the first agent includes a secret key from an asymmetrical public key pair associated with the second agent.

5. The method as defined by claim 1 wherein the second agent variable is produced by the second agent.

6. A method of mediating delivery of a document from a first site to a second site, the first site having an associated first agent, the second site having an associated second agent, the first site encrypting the document to produce an encrypted document, the method comprising:

receiving a copy of the encrypted document at an input of the second agent;

producing a second agent variable based upon a parameter not available to the first agent, the second agent variable being associated with a decrypting key for decrypting the encrypted document;

directing the second agent variable to the first agent after receipt of the copy of the encrypted document at the input of the second agent, wherein an additional encrypted copy of the document is encrypted by the second site and transmitted to the second agent, the method further comprising:

receiving, at an input of the second agent, a first agent variable that is based upon a parameter not available to the second agent, the first agent variable being associated with the decrypting key;

producing the decrypting key based upon the first agent variable and the second agent variable;

decrypting both the copy of the encrypted document and the additional encrypted copy of the document with the produced decrypting key to produce a decrypted copy and an additional decrypted copy;

comparing the decrypted copy with the additional decrypted copy to determine consistency; and delivering one of the decrypted copy or the additional decrypted copy of the document to the second site if the document is deemed to be consistent.

7. The method as defined by claim 6 wherein the decrypted copy and additional decrypted copy each include at least a body portion, the step of comparing including:

deeming the decrypted copy to be consistent with the additional decrypted copy if the body portions of both decrypted documents are determined to be identical.

8. The method as defined by claim 7 wherein the step of comparing includes:

bitwise comparing the body of the decrypted copy with the additional decrypted copy.

9. The method as defined by claim 7 wherein the decrypted copy and additional decrypted copy each include an additional portion, the step of comparing including:

deeming the decrypted copy to be consistent with the additional decrypted copy regardless of the similarity of their additional portions.

10. The method as defined by claim 9 wherein the additional portion includes a digital signature.

11. A receiving agent for mediating delivery of a document from a sending site to a receiving site, the sending site having an associated sending agent, the sending site encrypting the document to produce an encrypted document, the receiving agent comprising:

an input that receives a copy of the encrypted document;

a variable producer that produces a receiving agent variable based upon a parameter not available to the sending agent, the receiving agent variable being associated with a decrypting key for decrypting the encrypted document;

an output that directs the receiving agent variable from the receiving agent to the sending agent after receipt of the copy of the encrypted document via the input;

a decrypter that decrypts the copy of the encrypted document to produce a decrypted copy; and a transmitter that transmits the decrypted copy to the receiving site.

12. The receiving agent as defined by claim 11 wherein the copy of the encrypted document is received at the input from the sending site.

13. The receiving agent as defined by claim 11 wherein the decrypter comprises:

an input that receives a sending agent variable from the sending agent, the sending agent variable being based upon a parameter not available to the receiving agent;

a key producer that utilizes the sending agent variable and receiving agent variable as variables for a function that produces the decrypting key; and a key applier that applies the decrypting key to the copy of the encrypted document to produce the decrypted copy.

14. The receiving agent as defined by claim 11 wherein the receiving agent variable is directed to the sending agent via a secure channel.

15. The receiving agent as defined by claim 11 wherein the parameter not available to the sending agent includes a secret key from an asymmetrical public key pair associated with the receiving agent.

16. A receiving agent for mediating delivery of a document from a sending site to a receiving site, the sending site having an associated sending agent, the sending site encrypting the document to produce an encrypted document, the receiving agent comprising:

an input that receives a copy of the encrypted document;

a variable producer that produces a receiving agent variable based upon a parameter not available to the sending agent, the receiving agent variable being associated with a decrypting key for decrypting the encrypted document; and an output that directs the receiving agent variable from the receiving agent to the sending agent after receipt of the copy of the encrypted document via the input, wherein an additional encrypted copy of the document is encrypted by the second site and transmitted to the second agent, the receiving agent further comprising:

a variable input that receives a first agent variable that is based upon a parameter not available to the second agent, the first agent variable being associated with the decrypting key;

a key producer that produces the decrypting key based upon the first agent variable and the second agent variable;

a decrypter that utilizes the produced decrypting key to decrypt both the copy of the encrypted document and the additional encrypted copy of the document to produce a decrypted copy and an additional decrypted copy;

a comparator that compares the decrypted copy with the additional decrypted copy to determine consistency; and an output that delivers the copy of the document to the second site if the document is deemed to be consistent.

17. The receiving agent as defined by claim 16 wherein the decrypted copy and additional decrypted copy each include at least a body portion, the comparitor deeming the decrypted copy to be consistent with the additional decrypted copy if the body portions of both decrypted documents are determined to be identical.

18. The receiving agent as defined by claim 17 wherein the comparitor includes a bitwise comparitor that bitwise compares the body of the decrypted copy with the additional decrypted copy.

19. The receiving agent as defined by claim 17 wherein the decrypted copy and additional decrypted copy each include an additional portion, the comparitor deeming the decrypted copy to be consistent with the additional decrypted copy regardless of the similarity of their additional portions.

20. The receiving agent as defined by claim 19 wherein the additional portion includes a digital signature.

21. A receiving agent for mediating delivery of a document from a sending site to a receiving site, the sending site having an associated sending agent, the sending site encrypting the document to produce an encrypted document, the receiving agent comprising:

means for receiving a copy of the encrypted document;

means for producing a receiving agent variable based upon a parameter not available to the sending agent, the receiving agent variable being associated with a decrypting key for decrypting the encrypted document;

means for directing the receiving agent variable from the receiving agent to the sending agent after receipt of the copy of the encrypted document;

means for decrypting the copy of the encrypted document to produce a decrypted copy; and means for transmitting the decrypted copy to the receiving site.

22. The receiving agent as defined by claim 21 wherein the decrypting means comprises:

means for receiving a sending agent variable from the sending agent, the sending agent variable being based upon a parameter not available to the receiving agent;

means for utilizing the sending agent variable and receiving agent variable as variables for a function that produces the decrypting key; and means for applying the decrypting key to the copy of the encrypted document to produce the decrypted copy.

23. The receiving agent as defined by claim 21 wherein an additional encrypted copy of the document is encrypted by the second site and transmitted to the second agent, the receiving agent further comprising:

means for receiving, at an input of the second agent, a first agent variable that is based upon a parameter not available to the second agent, the first agent variable being associated with the decrypting key;

means for producing the decrypting key based upon the first agent variable and the second agent variable;

means for decrypting both the copy of the encrypted document and the additional encrypted copy of the document with the produced decrypting key to produce a decrypted copy and an additional decrypted copy;

means for comparing the decrypted copy with the additional decrypted copy to determine consistency; and means for delivering one of the decrypted copy or the additional decrypted copy of the document to the second site if the document is deemed to be consistent.

24. The receiving agent as defined by claim 23 wherein the decrypted copy and additional decrypted copy each include at least a body portion, the means for comparing including:

means for deeming the decrypted copy to be consistent with the additional decrypted copy if the body portions of both decrypted documents are determined to be identical.

25. A computer program product for use on a computer system, the computer program product acting as a receiving agent for mediating delivery of a document from a sending site to a receiving site, the sending site having an associated sending agent, the sending site encrypting the document to produce an encrypted document, the computer program product comprising a computer usable medium having computer readable program code thereon, the computer readable program code including:

program code for receiving a copy of the encrypted document;

program code for producing a receiving agent variable based upon a parameter not available to the sending agent, the receiving agent variable being associated with a decrypting key for decrypting the encrypted document; and program code for directing the receiving agent variable to the sending agent after receipt of the copy of the encrypted document.

26. The computer program product as defined by claim 25 further comprising:

program code for decrypting the copy of the encrypted document to produce a decrypted copy; and program code for transmitting the decrypted copy to the receiving site.

27. The computer program product as defined by claim 26 wherein the program code for decrypting comprises:

program code for receiving a sending agent variable from the sending agent, the sending agent variable being based upon a parameter not available to the receiving agent;

program code for utilizing the sending agent variable and-receiving agent variable as variables for a function that produces the decrypting key; and program code for applying the decrypting key to the copy of the encrypted document to produce the decrypted copy.

28. The computer program product as defined by claim 25 wherein the copy of the encrypted document is received from the sending site.

29. The computer program product as defined by claim 25 wherein the second agent variable is directed to the sending agent via a secure channel.

30. The computer program product as defined by claim 25 wherein the parameter not available to the sending agent includes a secret key from an asymmetrical public key pair associated with the receiving agent.

31. The computer program product as defined by claim 25 wherein an additional encrypted copy of the document is encrypted by the second site and transmitted to the second agent, the receiving agent further comprising:

program code for receiving a first agent variable that is based upon a parameter not available to the second agent, the first agent variable being associated with the decrypting key;

program code for producing the decrypting key based upon the first agent variable and the second agent variable;

program code for utilizing the produced decrypting key to decrypt both the copy of the encrypted document and the additional encrypted copy of the document to produce a decrypted copy and an additional decrypted copy;

program code for comparing the decrypted copy with the additional decrypted copy to determine consistency; and program code for delivering one of the decrypted copy or the additional decrypted copy to the second site if the document is deemed to be consistent.

32. The computer program product as defined by claim 31 wherein the decrypted copy and additional decrypted copy each include at least a body portion, the program code for comparing including:

program code for deeming the decrypted copy to be consistent with the additional decrypted copy if the body portions of both decrypted documents are determined to be identical.

33. The computer program product as defined by claim 32 wherein the program code for comparing includes:

program code for bitwise comparing the body of the decrypted copy with the additional decrypted copy.

34. The computer program product as defined by claim 32 wherein the decrypted copy and additional decrypted copy each include an additional portion, the program code for comparing including:

program code for deeming the decrypted copy to be consistent with the additional decrypted copy regardless of the similarity of their additional portions.

35. The computer program product as defined by claim 34 wherein the additional portion includes a digital signature.

36. A method of mediating delivery of a document from a first site to a second site, the first site encrypting the document to produce an encrypted document, the method comprising:

receiving a copy of the encrypted document at an input of the second site;

producing a second variable based upon a parameter not available to the first site, the second variable being associated with a decrypting key for decrypting the encrypted document; and directing the second variable to the first site after receipt of the copy of the encrypted document at the input, wherein the first site includes a first agent and the second site includes a second agent, the input to the second site being coupled with the second agent;

wherein an additional encrypted copy of the document is encrypted by the second site and transmitted to the second agent, the method further comprising:

receiving, at the input, a first variable that is based upon a parameter not available to the second agent, the first agent variable being associated with the decrypting key;

producing the decrypting key based upon the first variable and the second variable;

decrypting both the copy of the encrypted document and the additional encrypted copy of the document with the produced decrypting key to produce a decrypted copy and an additional decrypted copy;

comparing the decrypted copy with the additional decrypted copy to determine consistency; and delivering one of the decrypted copy or the additional decrypted copy of the document to the second site if the document is deemed to be consistent.

37. A method of mediating delivery of a document from a first site to a second site, the first site having an associated first agent with non-volatile memory, the second site having an associated second agent, the first site encrypting the document to produce an encrypted document that is transmitted to the first agent and the second agent, the method comprising:

producing a first agent variable based upon a parameter that is not available to the second agent, the first agent variable being associated with a decrypting key for decrypting the encrypted document;

receiving a second agent variable that is produced by the second agent after the encrypted document is received by the second agent, the second agent variable being based upon a parameter that is not available to the first agent, the second agent variable also being associated with the decrypting key;

storing the first agent variable, the second agent variable, and a copy of the encrypted document in the non-volatile memory;

retrieving the first agent variable, the second agent variable, and copy of the encrypted document from the non-volatile memory of the first agent;

producing the decrypting key from the first agent variable and the second agent variable; and utilizing the decrypting key to decrypt the copy of the encrypted document.

38. The method as defined by claim 37 comprising:
confirming the consistency of the document.

39. An apparatus for mediating delivery of a document from a first site to a second site, the first site having an associated first agent, the second site having an associated second agent, the first site encrypting the document to produce an encrypted document that is transmitted to the first agent and the second agent, the apparatus comprising:

a variable producer that produces a first agent variable based upon a parameter that is not available to the second agent, the first agent variable being associated with a decrypting key for decrypting the encrypted document;

a receiver that receives a second agent variable that is produced by the second agent after the encrypted document is received by the second agent, the second agent variable being based upon a parameter that is not available to the first agent, the second agent variable also being associated with the decrypting key;

non-volatile memory for storing the first agent variable, the second agent variable, and a copy of the encrypted document;

a retriever that retrieves the first agent variable, the second agent variable, and copy of the encrypted document from the non-volatile memory of the first agent;

a key producer that produces the decrypting key from the first agent variable and the second agent variable; and a decrypter that utilizes the decrypting key to decrypt the copy of the encrypted document.

40. The apparatus as defined by claim 39 comprising:
a consistency checker that confirms the consistency of the document.

41. A computer program product for use on a computer system, the computer program product mediating delivery of a document from a first site to a second site, the first site having an associated first agent with non-volatile memory, the second site having an associated second agent, the first site encrypting the document to produce an encrypted document that is transmitted to the first agent and the second agent, the computer program product comprising a computer usable medium having computer readable program code thereon, the computer readable program code including:

program code for producing a first agent variable based upon a parameter that is not available to the second agent, the first agent variable being associated with a decrypting key for decrypting the encrypted document;

program code for receiving a second agent variable that is produced by the second agent after the encrypted document is received by the second agent, the second agent variable being based upon a parameter that is not available to the first agent, the second agent variable also being associated with the decrypting key; and program code for storing the first agent variable, the second agent variable, and a copy of the encrypted document in the non-volatile memory.

42. The computer program product as defined by claim 41 further comprising:

program code for retrieving the first agent variable, the second agent variable, and copy of the encrypted document from the non-volatile memory of the first agent;

program code for producing the decrypting key from the first agent variable and the second agent variable; and program code for utilizing the decrypting key to decrypt the copy of the encrypted document.

43. The computer program product as defined by claim 41 comprising:

program code for confirming the consistency of the document.

44. A method of mediating delivery of a document from a first site to a second site, the first site encrypting the document to produce an encrypted document, the method comprising:

providing a first agent that is associated with the first site;

providing a second agent that is associated with the second site;

receiving a copy of the encrypted document at an input of the second agent;

producing a second agent variable based upon a parameter not available to the first agent, the second agent variable being associated with a decrypting key for decrypting the encrypted document;

directing the second agent variable to the first agent after receipt of the copy of the encrypted document at the input of the second agent;

decrypting the copy of the encrypted document to produce a decrypted copy;

transmitting the decrypted copy to the second site, wherein the step of decrypting comprises:

receiving a first agent variable from the first agent, the first agent variable being based upon a parameter that is not available to the second agent;

utilizing the first agent variable and second agent variable as variables for a function that produces the decrypting key; and applying the decrypting key to the copy of the encrypted document to produce the decrypted copy.

45. An apparatus for mediating delivery of a document from a first site to a second site, the first site encrypting the document to produce an encrypted document, the apparatus comprising:

a first agent that is associated with the first site;

a second agent that is associated with the second site;

a receiver that receives a copy of the encrypted document at an input of the second agent;

a variable producer that produces a second agent variable based upon a parameter not available to the first agent, the second agent variable being associated with a decrypting key for decrypting the encrypted document;

a variable director that directs the second agent variable to the first agent after receipt of the copy of the encrypted document at the input of the second agent;

a decrypter that decrypts that copy of the encrypted document to produce a decrypted copy; and a transmitter that transmits the decrypted copy to the second site, wherein the decirpter comprises:

a receiver that receives a first agent variable from the first agent the first agent variable being based upon a parameter that is not available to the second agent;

a key generator that utilizes the first agent variable and second agent variable as variables for a function that produces the decrypting key; and a copy producer that applies the decrypting key to the copy of the encrypted document to produce the decrypted copy.

46. A computer program product for use on a computer system, the computer program product mediating delivery of a document from a first site to a second site, the first site encrypting the document to produce an encrypted document, the computer program product comprising a computer usable medium having computer readable program code thereon, the computer readable program code including:

program code providing a first agent that is associated with the first site;

program code for providing a second agent that is associated with the second site; program code for receiving a copy of the encrypted document at an input of the second agent;

program code for producing a second agent variable based upon a parameter not available to the first agent, the second agent variable being associated with a decrypting key for decrypting the encrypted document; and program code for directing the second agent variable to the first agent after receipt of the copy of the encrypted document at the input of the second agent.

47. The computer program product as defined by claim 46 further comprising:

program code for decrypting the copy of the encrypted document to produce a decrypted copy; and program code for transmitting the decrypted copy to the second site.

48. The computer program product as defined by claim 47 wherein the program code for decrypting comprises:

program code for receiving a first agent variable from the first agent, the first agent variable being based upon a parameter that is not available to the second agent;

program code for utilizing the first agent variable and second agent variable as variables for a function that produces the decrypting key; and program code for applying the decrypting key to the copy of the encrypted document to produce the decrypted copy.

* * * * *

UNITED STATES PATENT AND TRADEMARK OFFICE
CERTIFICATE OF CORRECTION

PATENT NO. : 6,115,699
DATED : September 5, 2000
INVENTOR(S) : Thomas Hardjono

It is certified that error appears in the above-identified patent and that said Letters Patent are hereby corrected as shown below:

Col. 13, line 50, delete "-" after "and"
Col. 17, line 22, change "decirpter" to --decrypter--
Col. 17, line 24, insert --,-- after the first instance of "agent"

Signed and Sealed this

Fifteenth Day of May, 2001

*Attest:*

NICHOLAS P. GODICI

*Attesting Officer*     *Acting Director of the United States Patent and Trademark Office*